(12) United States Patent
Zanni et al.

(10) Patent No.: US 9,568,366 B2
(45) Date of Patent: Feb. 14, 2017

(54) MULTIDIMENSIONAL SPECTROMETER

(71) Applicant: Wisconsin Alumni Research Foundation, Madison, WI (US)

(72) Inventors: Martin Thomas Zanni, Madison, WI (US); Peter Hamm, Zurich (CH); Jan Helbing, Zurich (CH)

(73) Assignees: Wisconsin Alumni Research Foundation, Madison, WI (US); University of Zurich, Zurich (CH)

(*) Notice: Subject to any disclaimer, the term of this patent is extended or adjusted under 35 U.S.C. 154(b) by 0 days.

(21) Appl. No.: 14/713,329

(22) Filed: May 15, 2015

(65) Prior Publication Data
US 2015/0260577 A1 Sep. 17, 2015

Related U.S. Application Data

(63) Continuation of application No. 13/047,462, filed on Mar. 14, 2011, now Pat. No. 9,052,239.

(51) Int. Cl.
G01B 9/02 (2006.01)
G01J 3/457 (2006.01)
G01J 3/433 (2006.01)

(52) U.S. Cl.
CPC ............. *G01J 3/457* (2013.01); *G01J 3/433* (2013.01)

(58) Field of Classification Search
CPC ........ G01J 3/00; G01J 3/2823; G01B 9/02014

USPC ................................................ 356/326, 451
See application file for complete search history.

(56) References Cited

U.S. PATENT DOCUMENTS

| 6,982,792 B1* | 1/2006 | Woollam | G01J 3/02 356/369 |
| 7,352,469 B2* | 4/2008 | McGrew | B82Y 10/00 356/301 |
| 2006/0063188 A1 | 3/2006 | Zanni et al. | |
| 2009/0161092 A1 | 6/2009 | Zanni et al. | |
| 2010/0133437 A1 | 6/2010 | Azimi et al. | |

OTHER PUBLICATIONS

Xiong, Wei, et al., Signal Enhancement and Background Cancellation in Collinear Two-Dimensional Spectroscopies, pp. 1371, vol. 33, No. 12, Jun. 15, 2008, Optics Letters, Optical Society of America, Washington, DC, USA.

* cited by examiner

*Primary Examiner* — Jonathan Hansen
(74) *Attorney, Agent, or Firm* — Boyle Fredrickson, S.C.

(57) ABSTRACT

A multidimensional spectrometer encodes frequency information into laser pulses so that a frequency insensitive detector may be used to collect data for a multi-dimensional spectrograph only from intensity information and knowledge of a modulation providing the encoding. In one embodiment the frequency encoding may be done by a conventional interferometer greatly simplifying construction of the spectrometer.

17 Claims, 3 Drawing Sheets

MULTIDIMENSIONAL SPECTROMETER

CROSS REFERENCE TO RELATED APPLICATION

This application is a continuation of application Ser. No. 13/047,462 filed Mar. 14, 2011 and hereby incorporated by reference.

STATEMENT REGARDING FEDERALLY SPONSORED RESEARCH OR DEVELOPMENT

This invention was made with government support under DK079895 awarded by the National Institutes of Health and 0350518 and 1013324 awarded by the National Science Foundation. The government has certain rights in the invention.

BACKGROUND OF THE INVENTION

The present invention relates to two-dimensional spectrometers.

Two-dimensional spectroscopy can reveal the interaction between coupled systems of atoms and/or molecules. In a 2D spectrum, electromagnetic transitions of atoms or molecules give rise to signals that, lie on the spectrum diagonal, and if there are interactions between transitions within or among molecules, then cross peaks will also appear in the spectrum. Thus, the diagonal and cross peaks can be used to deduce molecular structures or identify mixtures of compounds, etc. Multidimensional spectra of 3D or higher provide additional information.

To collect a 2D spectrum, one needs to generate multiple light pulses to interrogate the sample. Some examples for two-dimensional spectroscopy are described, for example, in US patent application 2006/0063188 filed Sep. 15, 2005 and US patent application 2009/0161092 filed Dec. 21, 2007 both hereby incorporated by reference.

Existing multidimensional spectrometers require specialized and complex optical components and are correspondingly expensive and difficult to manufacture.

SUMMARY OF THE INVENTION

The present invention provides a simplified and robust multidimensional spectrometer that encodes frequency information into temporal characteristics of laser beams (changing spectrum or phase) traveling along two optical paths. This allows a multidimensional spectrograph to be generated with a simple and highly sensitive single channel detector without the need for frequency resolving the signal, which greatly simplifies the construction of the device. In one embodiment, this encoding may be done by common Michelson-type interferometers greatly simplifying construction of such spectrometers.

Specifically, the present invention provides multi-dimensional spectrometer having a first and second spectral modulator producing corresponding light pulses which may be directed through a sample volume to be received by an intensity sensitive detector. A controller communicates with the first and second spectral modulator to controllably modulate both the first and second light pulses so that a two dimensional spectrum of a sample in the sample volume may be generated solely from the intensity and modulation information.

It is thus one feature of a least one embodiment of the invention to permit multidimensional spectroscopy by using only two optical paths and without complex and expensive, frequency-discriminating detection such a spectrometer and an array detector.

The first and second spectral modulator may produce pairs of light pulses with first and second controllable time separations, the controller modulating the pulses by controllably altering the time between the pulses of each pulse pair It is thus a feature of a least one embodiment of the invention to provide simple mechanisms for synthesizing the required pulses and to control or characterize their properties, for example, by interference between two identical pulses.

The multi-dimensional spectrometer may include a processor receiving data from the detector and the first and second time separations, and applying a two-dimensional Fourier transform to the data as a function of the first and second time separations to provide a two-dimensional spectrograph of a sample in the sample volume.

It is thus a feature of a least one embodiment of the invention to permit rapid data acquisition by obtaining simultaneous absorption measurements at multiple frequencies that are later separated by a transformation such as the Fourier transform.

The multi-dimensional spectrometer may include a polarizer setting a polarization to a least one of the first and second light pulses.

It is thus a feature of a least one embodiment of the invention to permit polarization of the pulses to be controlled in certain experiment types.

The multi-dimensional spectrometer may include a phase modulator that alters the phase to a least one of the first and second light pulses.

It is thus a feature of a least one embodiment of the invention for the phases of the pulses to be controlled in certain experiment types.

At least one of the first and second spectral modulators may be an interferometer It is thus a feature of a least one embodiment of the invention to construct a multi-dimensional spectrometer from common optical components.

At least one of the first and second spectral modulators may provide a tracer beam and further include a fringe detector monitoring the tracer beam to deduce a change in the interferometer controlling the changes in time separation of the pulse pair formed by the interferometer.

It is thus a feature of a least one embodiment of the invention to permit rapid real time measurements with devices having mechanical element such as interferometer-type spectral modulators.

At least one of the first and second spectral modulators may provide an interference analyzer receiving a pair of light pulses of the spectral modulator to determine the absolute time separation of the pulses.

It is thus a feature of a least one embodiment of the invention to permit the resulting spectrograms to be repeatably located in frequency space without corruption by mechanical inaccuracies of interferometer mechanisms.

The controller may execute a stored program to provide constant velocity scanning in the first and second controllable time separations while collecting data from the detector at sample times and marking the collected data at each sample time with a first and second time separation measured at each sample time.

It is thus a feature of a least one embodiment of the invention to permit rapid data acquisition in a mechanical system without requiring settling times normally required for precise mechanical control.

The constant velocity scanning may provide a scanning pattern selected from the group consisting of substantially simultaneous variation of the first and second controllable time separations and substantially simultaneous variation of one of the first and second controllable time separations and intermittent variation of the other of the first and second controllable time separations.

It is thus a feature of a least one embodiment of the invention to permit flexible acquisition patterns that may be tailored to particular experimental requirements.

At least one of the first and second spectral modulators may be a pulse shaper that modulates the electric field spectral intensity, phase and/or polarization.

It is thus a feature of a least one embodiment of the invention to provide a multidimensional spectrometer that may flexibly employ alternative modulation systems.

The multi-dimensional spectrometer may include a beam splitter receiving a light pulse from a single laser source to provide a received light pulse to the first and second spectral modulator an optical delay element positioned in an optical path of at least one of the first and second spectral modulators. The controller may communicate with the optical delay element to control a time separation between the first and second light pulses.

It is thus a feature of a least one embodiment of the invention to permit the use of as few as one laser light source for generation of the probe and pump pulses.

At least one of the first and second spectral modulators may further control the time and phase envelope of the at least one of the first and second light pulses and wherein the controller further communicates with the modulator to alter the time and phase envelope of the at least one of the first and second light pulses.

It is thus a feature of a least one embodiment of the invention to provide a flexible control of other parameters of the probe and pump pulses.

The multi-dimensional spectrometer may further include at least one beam position detector and the controller further may operate to automatically align the beams with the sample volume by monitoring the beam position detector.

It is thus a feature of a least one embodiment of the invention provide a system with reduced optical paths that may be readily aligned automatically.

These particular features and advantages may apply to only some embodiments falling within the claims and thus do not define the scope of the invention. The following description and figures illustrate a preferred embodiment of the invention. Such an embodiment does not necessarily represent the full scope of the invention, however. Furthermore, some embodiments may include only parts of a preferred embodiment. Therefore, reference must be made to the claims for interpreting the scope of the invention.

DETAILED DESCRIPTION OF THE PREFERRED EMBODIMENT

Figure 1:
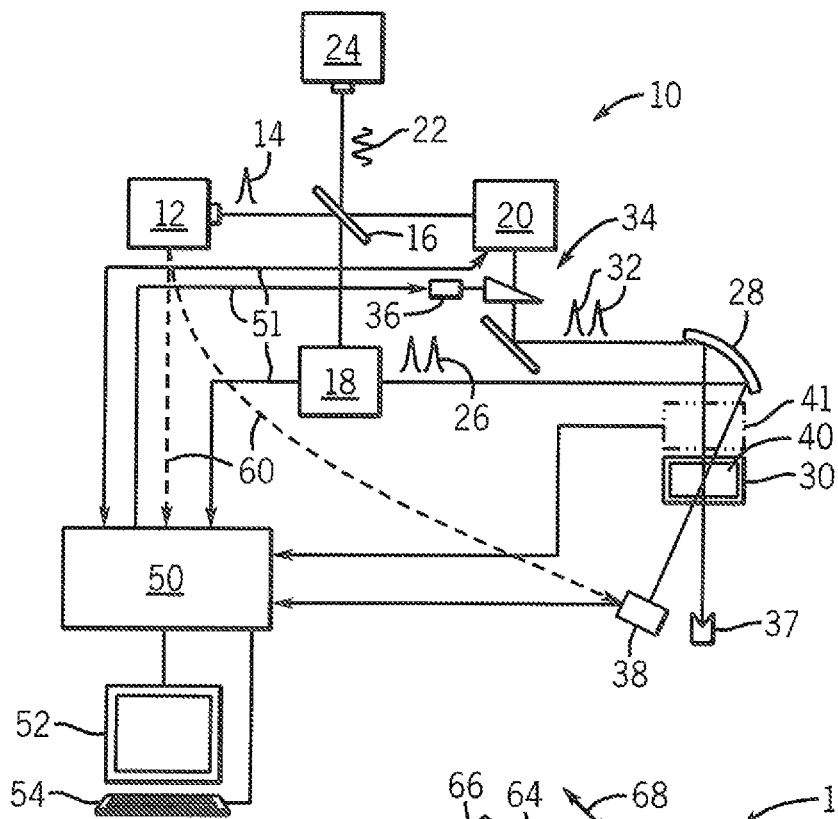
FIG. 1 is a block diagram of the present invention employing two spectral modulators for the generation of laser pulses for two-dimensional spectroscopy.

Referring now to FIG. 1, the present invention 10 uses a pulsed light source 12 producing a series of ultrashort laser pulses 14. Example pulses may have a center frequency of 800 nm, a frequency FWHM of 28 nm, a temporal FWHM of 50 femtoseconds, and a repetition rate of 1 KHz. A pulsed light source 12 suitable for this purpose is described in Montgomery et al., 110 J. Phys. Chem. A, 6391-6394 (2006), incorporated herein by reference. The light pulse from the laser may be received by an optical parametric amplifier (not shown) to convert it into the mid infrared region to reduce the mechanical sensitivity of the optical system resulting from longer wavelengths. Generally, the output of the pulsed light source 12 will include multiple frequencies spanning a desired frequency range of the spectrogram to be produced.

The pulses 14 may be received by a beam splitter 16 directing the pulses both to a first spectral modulator 18 and a second spectral modulator 20.

In a first embodiment, one or both of the spectral modulators 18 and 20 may be a Michelson-type interferometer. In this case, the beam splitter 16 may also receive a continuous wave signal 22 from a conventional laser 24, for example a helium-neon laser operating in the visible region. The continuous wave signal 22 is also directed to both of the spectral modulators 18 and 20 by action of the beam splitter 16.

Figure 2:
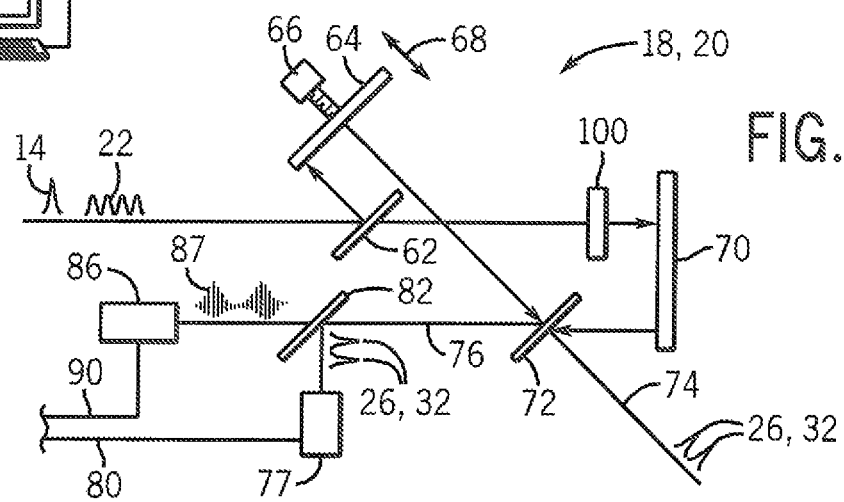
FIG. 2 is a detailed block diagram of a first embodiment of the spectral modulators of FIG. 1 employing Michelson-type interferometers and showing the optical path for a pulse and a local tracer laser beam and showing a fringe detector and phase detector used for characterization of the modulated pulses.
Figure 3:
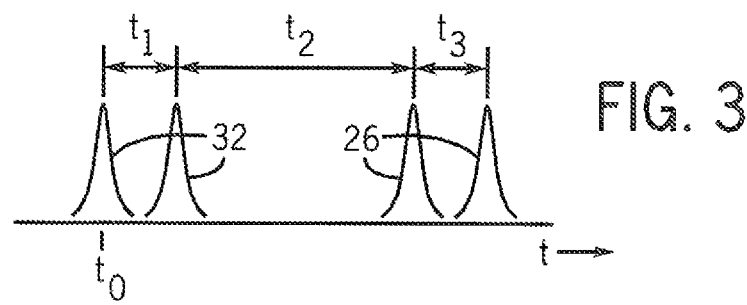
FIG. 3 is a time graph of an example pump pulse pair along the first optical path and an example probe pulse pair along the second optical path that might be produced by the present invention.

Referring now also to FIG. 2 and FIG. 3, one embodiment of the first and second spectral modulators 18 and 20, in the form of a Michelson interferometer, is shown. In the case of the first spectral modulator 18, the interferometer may take a single pulse 14 and produce a modulated pulse 26. When the spectral modulator is an interferometer of the Michelson type it is understood that the modulated pulse consists of a pair of pulses with a time separation of $t_3$. The modulated pulse 26 is received by a focusing mirror 28 and directed through a sample chamber 30 or the like to illuminate a sample material 40 at a first time $t_0$. It will be understood that other methods of directing the modulated pulse 26 through the sample chamber 30 may be used, for example, including one or more lenses.

In the case of the second spectral modulator 20, the interferometer will likewise take a single pulse 14 and produce a modulated pulse 32 having a time separation of $t_1$ and also received by the focusing mirror 28 to be directed through the sample chamber 30 to arrive at the sample material 40 at time $t_2$ before the modulated pulse 26. Alternatively, the two sets of pulses may also arrive in tandem or alternating with one another. This delay time $t_2$ is controlled by an optical delay element 34, for example, a movable wedge or other similar delay element that may be static or preferably dynamic and controlled by an actuator 36 such as a motor and encoder system for type known in the art.

Either or both of the modulated pulses 26 and 32 may pass through other optical elements 41 including polarizers, lenses, intensity attenuators, and phase shifters and the like, which may be controlled manually or automatically by means of the controller 50 as will be described below.

The modulated pulse 32 may pass through the sample chamber 30 after interaction with a sample material 40 contained therein to be received by a light stop 37. Emissions by the sample material 40, caused by the combination of the modulated pulse 26 and the modulated pulse 32, may pass out of the sample chamber 30 to be received by a detector 38 providing a measurement of light intensity or amplitude. The detector 38 may be a simple photo detector or may use a balanced detector system. Generally, the detector 38 need only provide sensitivity to light intensity and need not be able to discriminate among light frequencies.

Figure 9:
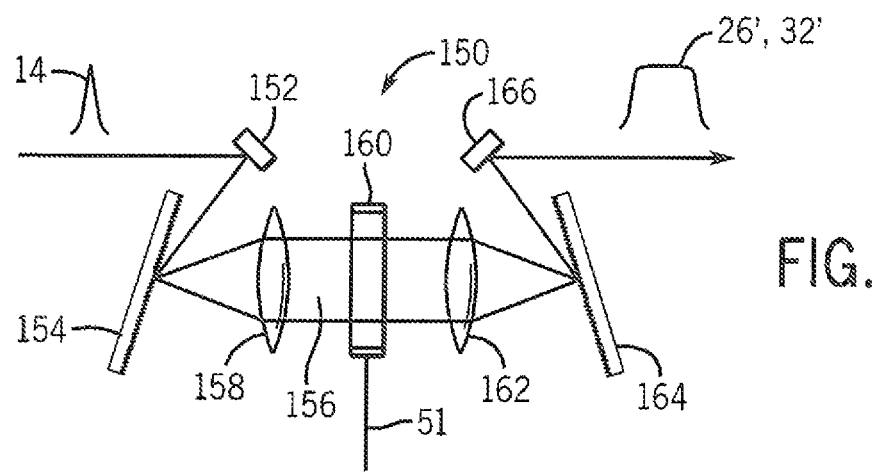
FIG. 9 is a detailed block diagram of a second embodiment of the spectral modulators of FIG. 1 employing pulse shapers, e.g. with acousto-optic modulators, for producing controlled modulated pulses.
Figure 10:
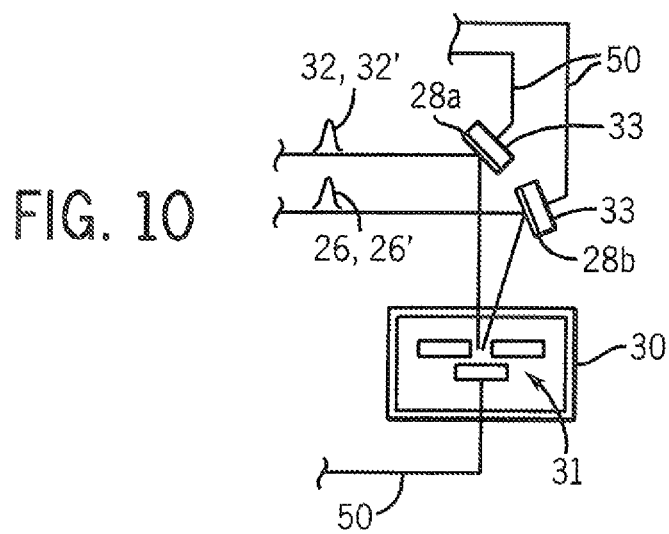
FIG. 10 is a fragmentary view of an alternative embodiment of the spectral modulators of FIG. 2 or 9 providing automatic beam alignment.

A controller 50, for example a computer to be described below, may provide bidirectional control signals 51 to and from the spectral modulators 18 and 20 controlling the relative delay changes between the modulated pulse-pair 26 ($t_3$) and between pulse-pair 32 ($t_1$) and reading fringe and phase information as will be described. Alternatively, when the spectral modulators are pulse-shapers, the controller will predetermine the properties of the modulated pulses. An additional control signal 53 may be provided to the actuator 36 to control the delay element 34 and thus the delay time $t_2$ and to the elements 41 to control polarization, intensity or the like for either or both of modulated pulses 26 and 32. Data from the detector 38 may be collected by the controller 50. The controller 50 may be connected to a graphic display terminal 52 or the like for displaying an output spectrogram or other data to a user input device 54 for entering data as may be required. Referring momentarily to FIG. 9, the controller 50 may also be used to alter the spatial or temporal overlap of the pulses 26, 32 in the sample chamber 30 by using, for example, a pin-hole detector 31 or similar target at the sample position and adjusting the optical path of the pulse is 26 and 32 by feedback using for example piezo crystals actuators 33 on the mirrors 28a and 28b and maximizing light received by the pin-hole detector 31.

The pulsed light source 12 may produce a pulse trigger signal 60 that may be provided to the spectral modulators 18 and 20 for use as will be described below and to the detector 38, for example for gating of the detector 38.

Referring now to FIG. 2, each of the spectral modulators 18 and 20, when implemented as interferometers, may receive the pulse 14 and continuous wave signal 22 along a common optical path that may be divided by beam splitter 62 to direct both the pulse 14 and continuous wave signal 22 to a movable reflector 64 controlled by actuator 66 and a stationary reflector 70. The movable reflector 64 may be moved along an axis 68 of the received pulse 14 and continuous wave signal 22 by the actuator 66 which may, for example, be a motor and position encoder pair. It will be understood that the movable reflectors 64 alternatively may be operated without direct control by the controller 50, for example, to free-run in a reciprocating pattern. This operation is possible because of the tagging of the data with accurate modulation information related to the position of the movable reflector 64 at the time of data sampling as will be described.

Reflected light from both the movable reflector 64 and the stationary reflector 70 may be received by a beam splitter 72 combining this light and directing it along an exiting optical path 74 and an internal optical path 76. A difference in the optical paths (1) from the beam splitter 62 through the movable reflector 64 to the optical path 74 after beam splitter 72 and (2) from the beam splitter 62 through the stationary reflector 70 to the optical path 74 after the beam splitter 72 defines the time and phase separation of pulse pairs of either the modulated pulse 26 or the modulated pulse 32 depending on the particular spectral modulators 18 and 20. In this way, the time values $t_3$ and/or $t_1$ may be controlled by movement of movable reflector 64 according to the general principle of the Michelson-type interferometer as will be understood in the art.

The internal optical path 76 provides the modulated pulse 26 (or modulated pulse 32) to a intensity detector 77, such as an infrared pyroelectric detector, which produces an interferogram output 80 which will be used to determine the absolute delay and phase difference between the pulse-pairs of the modulated pulse 26 and those of modulated pulse 32 as will be described further below.

The continuous wave signal 22 follows the same optical paths described above with respect to pulse 14 also traveling along the internal optical path 76 after interference with itself producing interference pattern 87. The interference pattern 87 presents a varying average intensity resulting from constructive and destructive interference between portions of the continuous wave signal 22. As such, it measures the same paths producing the modulated pulse 26 and modulated pulse 32 and can be used to calibrate path length changes. The interference pattern 87 is measured by a detector 86 to provide a fringe count output 90 as will be described. A beam splitter 82 and appropriate filters (not shown) may use to separate the interferogram 87 from the modulated pulses 26 or 32. Since interference pattern 87 is used only to measure delay changes, the continuous wave tracer beam and pulsed laser beam may also follow different but equivalent paths through the interferometer as will be understood in the art.

Figure 4:
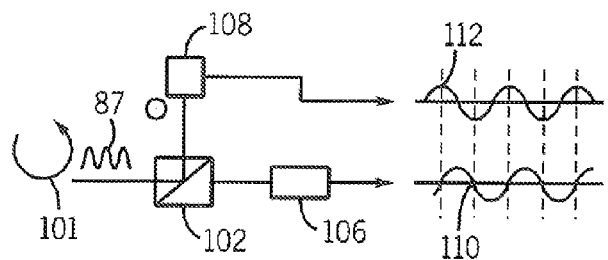
FIG. 4 is a detailed block diagram of the fringe detector of FIG. 2 showing the extraction of quadrature waveforms using orthogonal polarizing analyzers.

Referring still to FIG. 2, a wave plate 100 (for example, providing one quarter wavelength phase delay of the continuous wave signal 22) may be inserted in a portion of the optical path exclusive to stationary reflector 70 to provide a circular polarization of the continuous wave signal 22 from the stationary reflector 70. When this signal combines with the continuous wave signal 22 from the movable reflector 64 the interference pattern 87 consists of a superposition of circular and linear polarization as indicated by arrows 101 in FIG. 4. Referring now also to FIG. 4, the interference pattern 87 may be analyzed at two orthogonal polarizations, for example, by using a polarization cube 102 to separate the interference pattern 87 into two paths with perpendicular polarizations associated with corresponding detectors 106 and 108. As will be understood from this description, each detector 106 and 108 will produce an intensity signal 110 and 112 respectively that will be in quadrature phase. These quadrature intensity signals 110 and 112 allow a direction and magnitude of relative path length changes between the interferometer anus to be determined (by counting peaks or level crossings and analyzing the apparent relative order of the intensity signals 110 or 112 which will change according to directions of the delay change). From this information, a precise determination of the change of the time delays $t_3$ and $t_1$ for the modulated pulse 26 and modulated pulse 32 can be made. This fringe counting, which may be conducted by a program within the controller 50 or by an independent controller, provides a rapid indication of the change in these time values $t_3$ and $t_1$, and each intensity measurement by detectors 38 and 77 can thus be located on a (two-dimensional) time grid as now described.

Asynchronously with the motions of the actuators 66, per process block 125 (as will be described further below) the pulsed light source 12 may be fired periodically as indicated by process block 126 to produce a pulse 14. At each time of firing, as indicated by the pulse trigger signal 60, the controller 50 may record intensity information from the detector 38, a point of the interferograms from detectors 77 and fringe count outputs 90 from fringe counters 86 (one for each interferometer). The fringe count outputs are used to tag measured signal intensities and interferogram points which will be appended to the collected data per process block 130.

In the present invention this is supplemented with the periodic absolute calibration of the time grid as will now be described.

Figure 5:
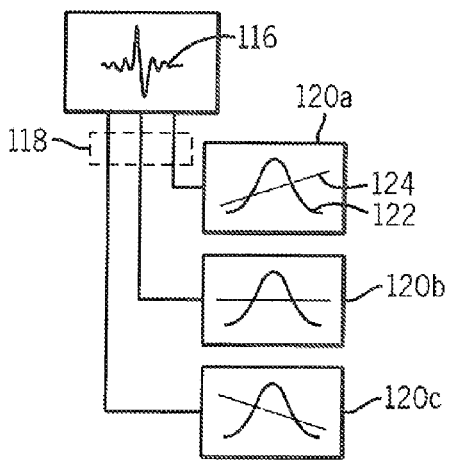
FIG. 5 is a diagram of an interferogram produced by the phase detector of FIG. 2 for deducing absolute delay and phase difference between the pulse pairs.

Referring now to FIG. 5, as noted above detector 77 measures an interferogram 116 as a function of $t_3$ or $t_1$ caused by the interference between the pulse-pair 26 or the pulse-pair 32 for spectral modulator 18 or 20. A Fourier transform (FT) 118 of the interferogram 116, for example, performed by a program in the controller 50 can be used to produce spectra 120 each having a frequency dependent amplitude value 122 and a frequency dependent phase 124 as will be understood in the art. For example, three different spectra 120a, 120b and 120c may be computed from the interferogram 116 by starting the Fourier transform at different sample points near the peak of the interferogram. When the starting sample point is near the absolute delay zero between the pulse-pair 26 (or pulse-pair 32) which will be near the peak of the interferogram 116, the phase 124 of that spectrum 120b will be substantially constant as a function of frequency as opposed to rising (per spectrum 120a, FT started at earlier sampling points) or falling (per spectrum 120c, FT started at later sampling point). This rising or falling of the phase of the spectrum 120 follows from the fact that different frequencies of the pulse 14 will be in phase and out of phase at different times. The starting sample points thus determined for interferometers 18 and 20 will be used as the starting points for the Fourier transform 140 of the signal recorded by detector 38. The two-dimensional spectrogram 142 is given by the real part of that two dimensional Fourier transform multiplied by the spectral phases 124 (one for each dimension $t_1$ and $t_3$) as will be understood in the art.

Figure 6:
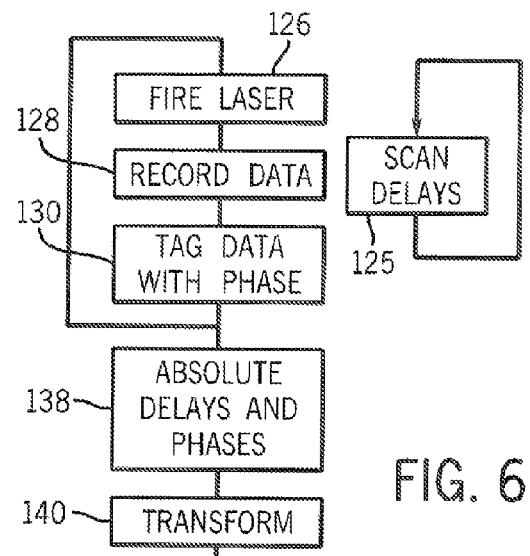
FIG. 6 is a flow chart showing high-speed constant velocity scanning and independent data acquisition possible with the present invention.

Referring now to FIG. 6, the ability to precisely calibrate the two-dimensional time grid allows the open loop control of the actuator 66 for smooth and continuous motion as indicated by process block 125 in which the actuators 66 may be operated without reference to a priori knowledge of the precise position of the movable reflectors 64 in the spectral modulators 18 and 20. The control is sometimes termed "constant velocity scanning" and refers primarily to the minimization of changes in velocity and does not require strict constant velocities. This constant velocity scanning contemplates that the actuators 66 themselves may have closed loop position sensing using local encoders; however, this closed loop control will be generally insufficiently accurate to precisely characterize time delays.

Figure 7:
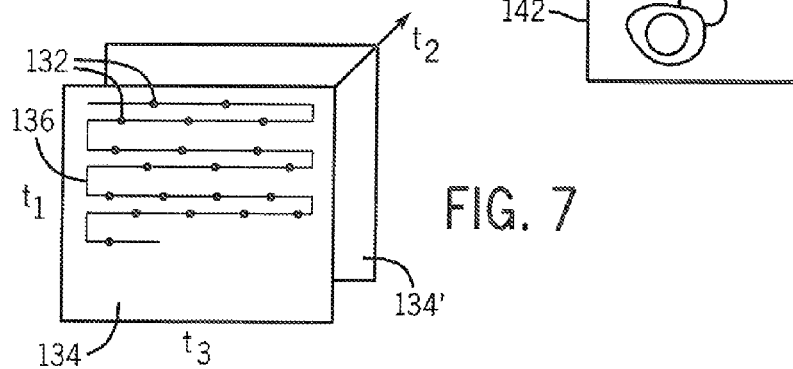
FIG. 7 is a diagram of a trajectory in time space for the collection of precursor spectrographic data per the present invention.

Referring now to FIG. 7, the actuators 66 may be operated so that the sample points 132 collected at process block 128 are spread in two dimensions corresponding generally to the times $t_1$ and $t_3$ as will be referred to here as a phase space 134. Note that the open loop control does not require that the sample points 132 be in specific locations within the phase space 134 so long as they are approximately evenly distributed within that space. A possible trajectory for the actuators 66 under the control of process block 125 in the phase space 134 may be a simple raster pattern 136; however, other scanning patterns may be adopted as may be suitable for the particular actuators 66. In one embodiment, each line in the $t_3$ dimension may be scanned in the forward and reverse direction and the sample points 132 interpolated to common $t_3$ values and averaged. Identical interpolation and averaging is used for the simultaneously recorded intensities by detectors 77, producing the two interferograms 116. At any time, but most simply at the conclusion of the collection of data for a given phase space 134, the delay element 34 may be moved to provide a new phase space 134' displaced by a dimension corresponding generally to time $t_2$. In this way, three dimensions of data may be obtained. It will be appreciated that other trajectories through phase space 134 may be adopted including those which provide for simultaneous change of dimensions $t_1$ and $t_3$ for example moving on a diagonal or circular trajectory.

Referring again to FIG. 6, as indicated by process blocks 138 and 140, once phase space 134 has been fully sampled to the resolution desired, grid calibration (as described above) and a two-dimensional Fourier transform along the perpendicular axes of $t_1$ and $t_3$ may be carried out on the averaged/interpolated data to extract the desired two-dimensional spectrogram 142. This Fourier transformation into a spectrogram 142 is possible because the spectral modulators 18 and 20 modulate the intensity in the dimensions $t_1$ and $t_3$. This modulation encodes intensity by frequency so that when transformed a spectrum is revealed.

Referring now to FIG. 9, in a second embodiment, one or both of the spectral modulators 18 and 20 may employ a pulse shaper instead of an interferometer for providing the necessary output pulses (here designated as modulated pulses 26' and 32'). As is understood in the art, a pulse shaper 150 may generally receive the pulses 14 from the beam splitter 16 (shown in FIG. 1) and direct them, for example, by a first mirror 152, to a diffraction grating 154 or similar device such as a prism, to produce a spectrally dispersed beam 156. The spectrally dispersed beam 156 may pass through a lens system 158 to a focal plane at which an acousto-optic or other type of modulator 160 is placed. The acousto-optic modulator 160 may receive a control signal 51 from the controller 50 to attenuate different portions of the spectrally dispersed beam 156 and hence to provide selective frequency attenuation or phase modulations of the spectrum of the spectrally dispersed beam 156. The spectrally dispersed beam 156, as modulate, is then reconstituted by lens system 162 and grating 164 to be directed by mirror 166 out of the spectral modulator 18 or 20 and ultimately toward the sample chamber 30 (shown in FIG. 1) as modulated pulse 26 (for the first spectral modulator 18) and modulated pulse 32' (for the second spectral modulator 20). Generally, the time envelope of modulated pulses 26' and 32' need not be two separate pulses but will have a similar spectral and phase characteristic as if synthesized by the techniques described with respect to the interferometer of FIG. 2. It will be understood that in this case the absolute (two-dimensional) time grid (phase-space) or equivalent information needed to extract the 2D-spectrum is typically encoded by the pulse shaper and pre-determined by the controller and need not be determined independently as described for the interferometer above.

It will be also appreciated that not only the spectral characteristics and phase characteristics of the modulated pulses 26 and 32' and modulated pulses 26 and 32 may be flexibly modified in this manner, but also the polarization, envelope shape, intensity and the like. It will be understood that a variety of variations on the described embodiments are contemplated by the present invention. For example although it is desired to use a single pulsed light source 12, two separate coordinated laser sources may also be used. Different interferometers such as a Mach Zehnder interferometer may be used. The delay mechanism of the delay element 34 may be a variety of different types of time delay systems including wave plates, retro reflectors, movable mirrors, polarizers and the like. Modified schemes for the generation of the quadrature signals 110 and 112 from the tracer beam and variants of the fringe counting algorithm may be employed. A variety of different optical systems including different lens and mirror configurations may be used instead of a mirror 28 for focusing the pulses on the sample chamber 30. Additional polarizers and the like may be used to manipulate the modulated pulse 26 and modulated pulse 32 to control their interaction with the sample. A conventional dispersion type spectrometer may also be used in conjunction with an array detector such as a CCD device instead of detector 38 eliminating the need for one interferometer and one dimension of Fourier transform. Beam splitters need not be conventional partially reflective plates but can be other functionally identical structures including wire grid polarizers or the like.

Figure 8:
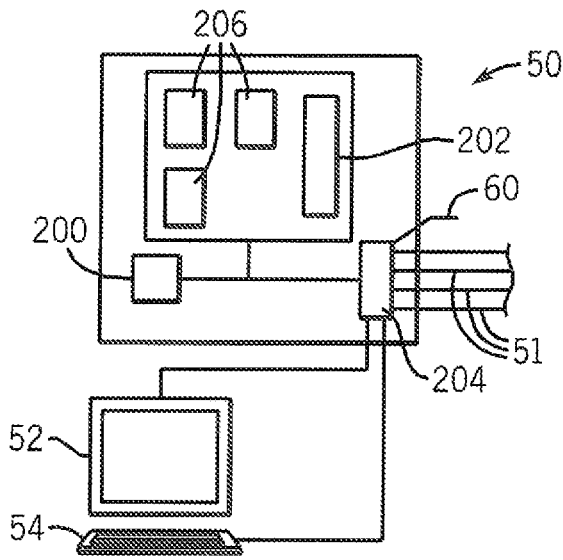
FIG. 8 is a block diagram of a computer suitable for use as a controller/processor per the present invention.

Referring now to FIG. 8, the controller 50 may be, for example, a standard computer providing a processor 200 communicating via an internal bus with the memory 202 and in interface 204, the latter communicating with the terminal 52 and the user input device 54 as well as providing the control signals 51 to the spectral modulators 18 and 20 and the delay element 34 and receiving phase and fringe counting information in return. The memory 202 may include the programs 206 implementing the above-described programs with respect to FIG. 6 including phase counting frequency analysis Fourier transforms and the like.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References in the claims and specification to a first and second modulator should not be interpreted as limited to two devices in separate housings or to two devices having separate components but may be realized with any device, including a single device, operating to provide independent modulation of two different light beams according to independent modulation signals. Likewise, each of the first and second modulators may be composed of multiple modulators.

References to "a controller" and "a processor" can be understood to include one or more controllers or processors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

We claim:

1. A multi-dimensional spectrometer comprising:
    a first spectral modulator producing at least one first modulated light pulse passing along a first optical path;
    a second spectral modulator producing at least one second modulated light pulse passing along a second optical path;
    a sample volume positioned at an intersection of the first and second light pulses;
    a detector positioned to measure an intensity of at least one of the first and second light pulses after passage through the sample volume; and
    a controller communicating with the detector and the first and second spectral modulator and operating to collect the intensity measured soley by the detector and modulation information during a modulation of the first and second light pulses so as to permit generation of a two dimensional spectrum of a sample in the sample volume solely from the intensity and modulation information;
    wherein the detector provides the intensity without discriminating among light frequencies.

2. The multi-dimensional spectrometer of claim 1 wherein the detector is a single photo detector.

3. The multi-dimensional spectrometer of claim 1 wherein the first and second spectral modulators are pulse shapers.

4. The multi-dimensional spectrometer of claim 3 wherein the pulse shapers provide a spectrally dispersing element followed by a spectrally reconstituting element, the spectrally dispersing element and spectrally reconstituting element positioned on either side of an electrically controlled spatial modulator.

5. The multi-dimensional spectrometer of claim 1 further including a processor receiving only intensity data from the detector and modulation data from a controller and applying a multi-dimensional Fourier transform to the data as a function of the modulation to provide a multi-dimensional spectrograph of a sample in the sample volume.

6. The multi-dimensional spectrometer of claim 1 further including a polarizer setting a polarization of a least one of the first and second light pulses.

7. The multi-dimensional spectrometer of claim 1 further including an electronically controlled phase shifting device communicating with the controller to alter the phase of at least one of the light pulses in the first and second pair of light pulses.

8. The multi-dimensional spectrometer of claim 1 wherein the first and second light paths are angled with respect to each other and further including a beam stop for absorbing an other of the first and second light pulses not received by the detector.

9. The multi-dimensional spectrometer of claim 1 further including at least one beam position detector and wherein the controller further operates to automatically align the first and second light pulses with the sample volume by monitoring the beam position detector.

10. The multi-dimensional spectrometer of claim 1 further including a beam splitter receiving a light pulse from a single laser source to provide a received light pulse to the first and second spectral modulator; and
    further including an optical delay element positioned in an optical path of at least one of the first and second spectral modulators; and
    wherein the controller further communicates with the optical delay element to control a time separation between the first and second light pulses.

11. A method of generating a multi-dimensional spectrograph comprising the steps of:
    (a) generating at least one first light pulse passing along a first optical path;
    (b) generating at least one second light pulse passing along a second optical path intersecting the first optical path at a sample volume holding a material to be analyzed;
    (c) detecting an intensity of at least one of the first and second light pulses after passage through the material using a detector providing a measure of light intensity without discriminating among light frequencies; and
    (d) modulating the first and second light pulses to permit generation of a two dimensional spectrum of a sample in the sample volume solely from the detected intensity and modulation information.

12. The method of claim 11 wherein the detector is a single photo detector.

13. The method of claim 11 wherein the first and second spectral modulators are pulse shapers.

14. The method of claim 13 wherein the pulse shapers provide a spectrally dispersing element followed by a spectrally reconstituting element, the spectrally dispersing element and spectrally reconstituting element positioned on either side of an electrically controlled spatial modulator.

15. The method of claim 11 further including a processor receiving only intensity data from the detector and modulation data from a controller and applying a multi-dimensional Fourier transform to the data as a function of the modulation to provide a multi-dimensional spectrograph of a sample in the sample volume.

16. The method of claim 11 further including the step of applying a two-dimensional Fourier transform to detected intensity information to provide a two-dimensional spectrograph of a sample in the sample volume.

17. The method of claim 1 wherein the controller outputs a two-dimensional spectrograph.

* * * * *